(12) United States Patent
Ozawa

(10) Patent No.: US 7,356,675 B2
(45) Date of Patent: Apr. 8, 2008

(54) DATA PROCESSOR

(75) Inventor: Motokazu Ozawa, Ashikaga (JP)

(73) Assignee: Renesas Technology Corp., Tokyo (JP)

( * ) Notice: Subject to any disclaimer, the term of this patent is extended or adjusted under 35 U.S.C. 154(b) by 60 days.

(21) Appl. No.: 11/482,062

(22) Filed: Jul. 7, 2006

(65) Prior Publication Data
US 2007/0038845 A1    Feb. 15, 2007

(30) Foreign Application Priority Data
Aug. 5, 2005    (JP) .............................. 2005-227695

(51) Int. Cl.
G06F 15/78    (2006.01)
(52) U.S. Cl. ....................................................... 712/219
(58) Field of Classification Search .................. 712/24, 712/219
See application file for complete search history.

(56) References Cited

U.S. PATENT DOCUMENTS

| | | | | |
|---|---|---|---|---|
| 4,750,112 A | * | 6/1988 | Jones et al. ................. | 712/217 |
| 5,526,500 A | * | 6/1996 | Tanksalvala et al. ........ | 712/218 |
| 6,629,167 B1 | * | 9/2003 | Undy et al. .................. | 710/52 |
| 6,859,873 B2 | * | 2/2005 | Norden et al. .............. | 712/220 |
| 7,185,182 B2 | * | 2/2007 | Col ............................. | 712/219 |

* cited by examiner

Primary Examiner—William M. Treat
(74) Attorney, Agent, or Firm—Miles & Stockbridge P.C.

(57) ABSTRACT

A data processor having: an instruction fetch unit for acquiring an instruction; and an instruction execution unit for execution, by pipeline processing, the instruction acquired by the instruction fetch unit. In the data processor, the instruction execution unit includes an execution pipeline pipelined into two or more stages for execution of the execution instruction, and an execution pipeline control unit capable of changing a stage to arrange an operation by the execution unit in according to the number of wait cycles until data required for execution of the execution instruction is fixed. The stage, where an operation by the execution unit is arranged, is changed according to the number of wait cycles until the data is fixed, whereby the number of input-fixing wait cycles increased by pipelining cache access can be reduced.

8 Claims, 13 Drawing Sheets

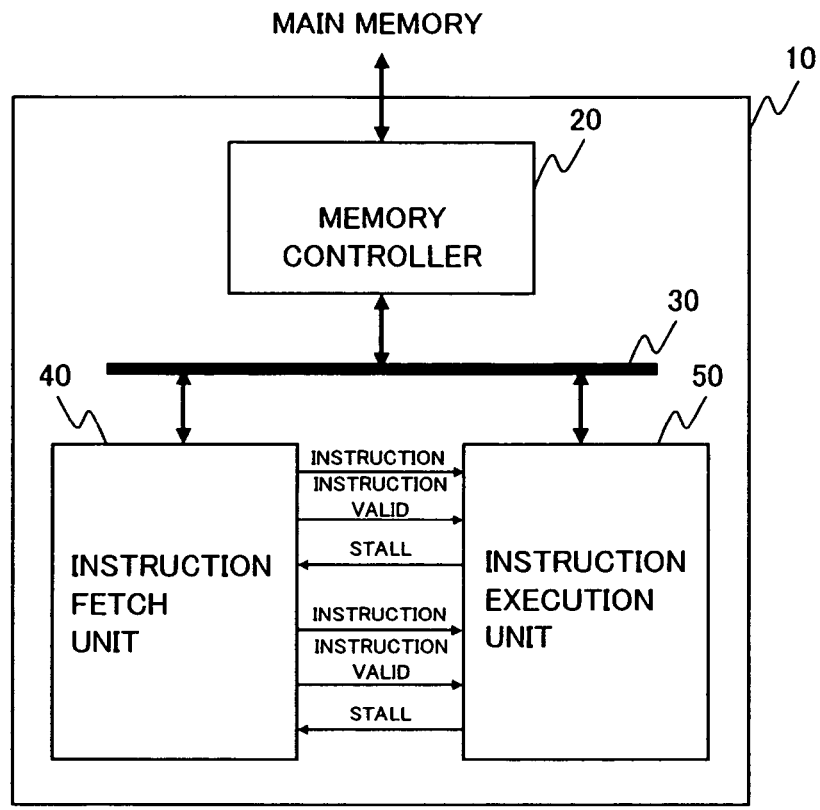
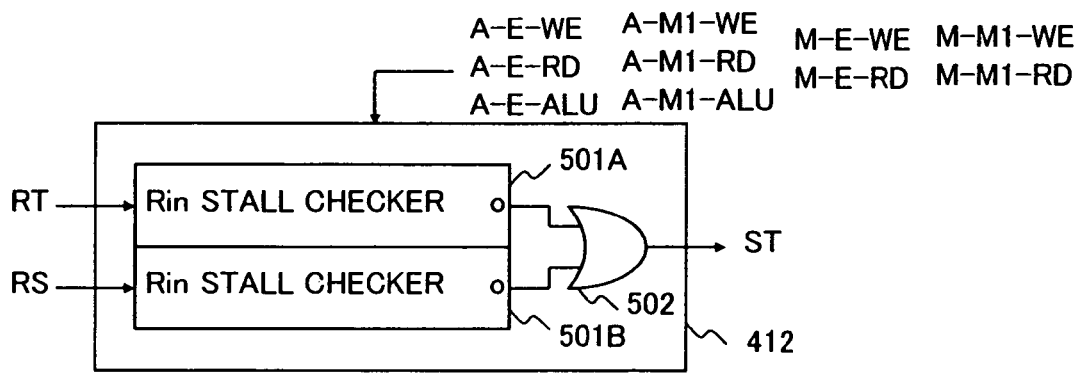

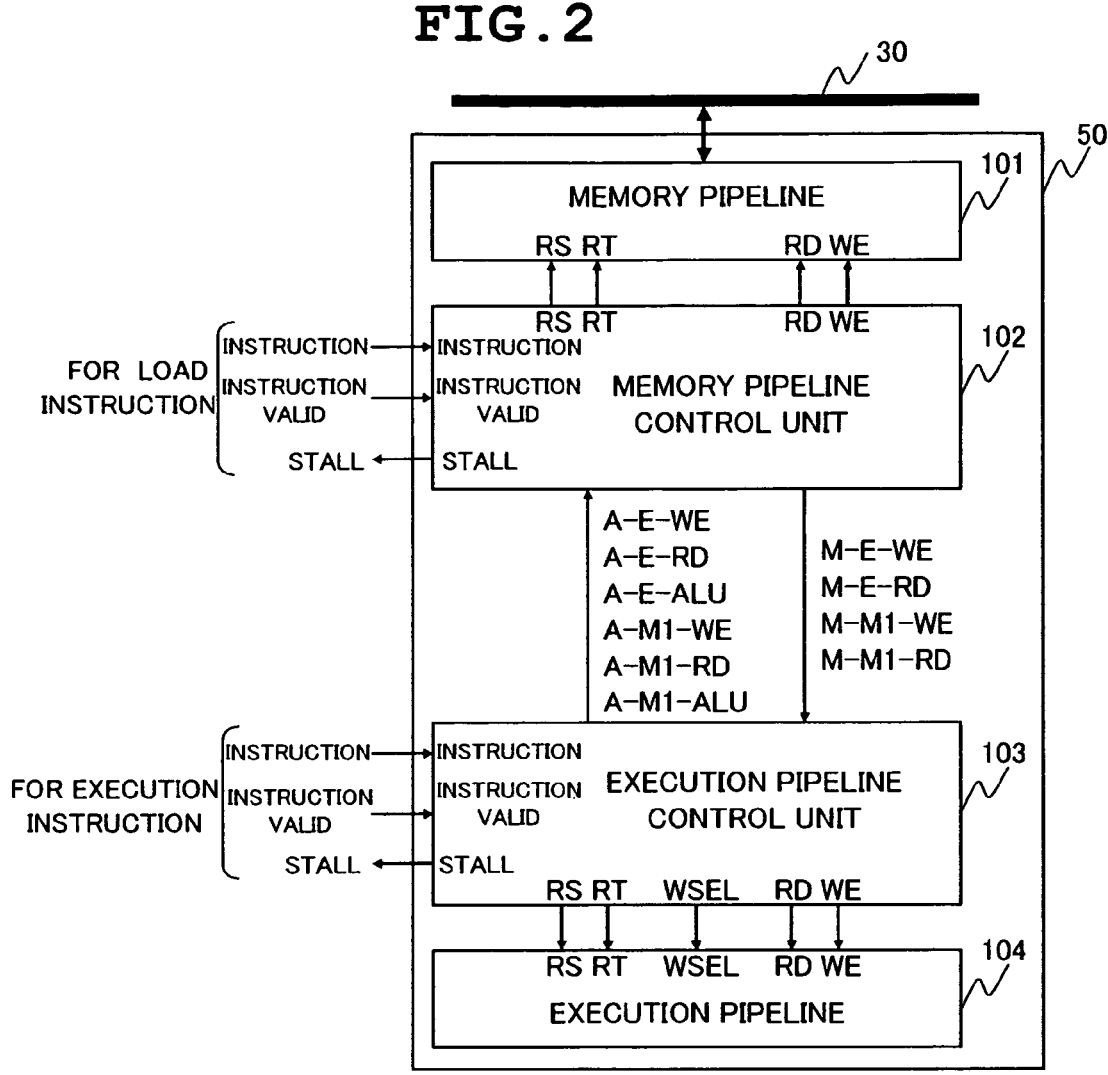
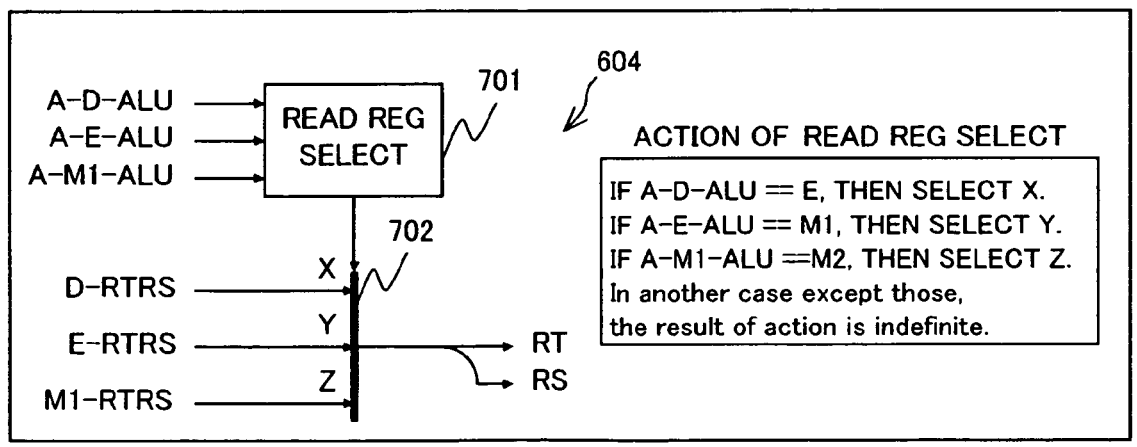

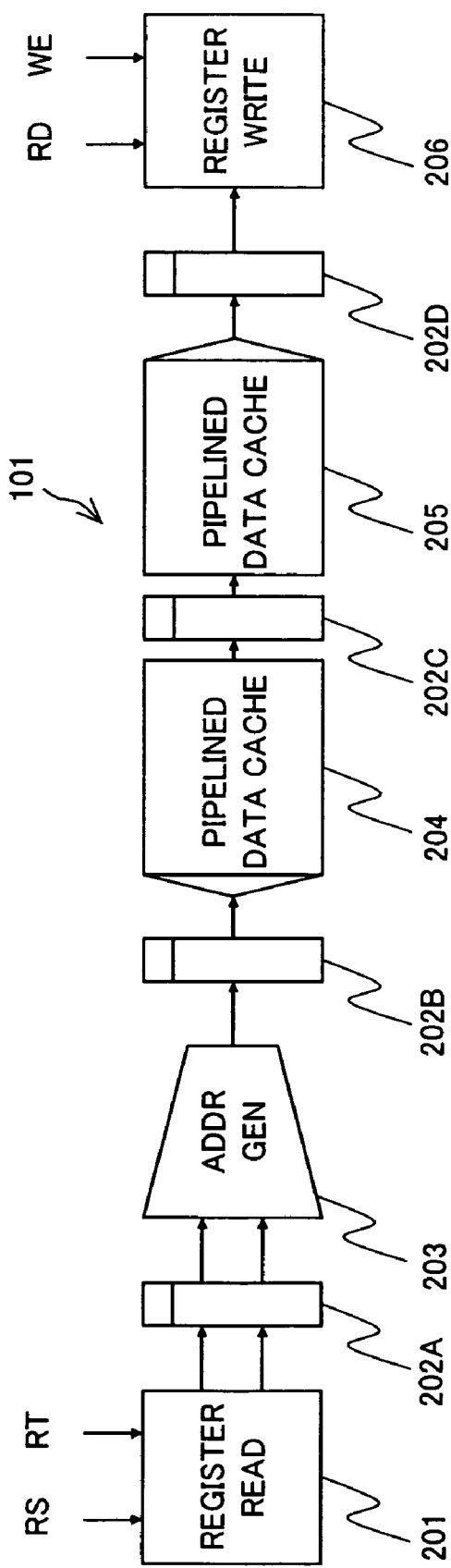

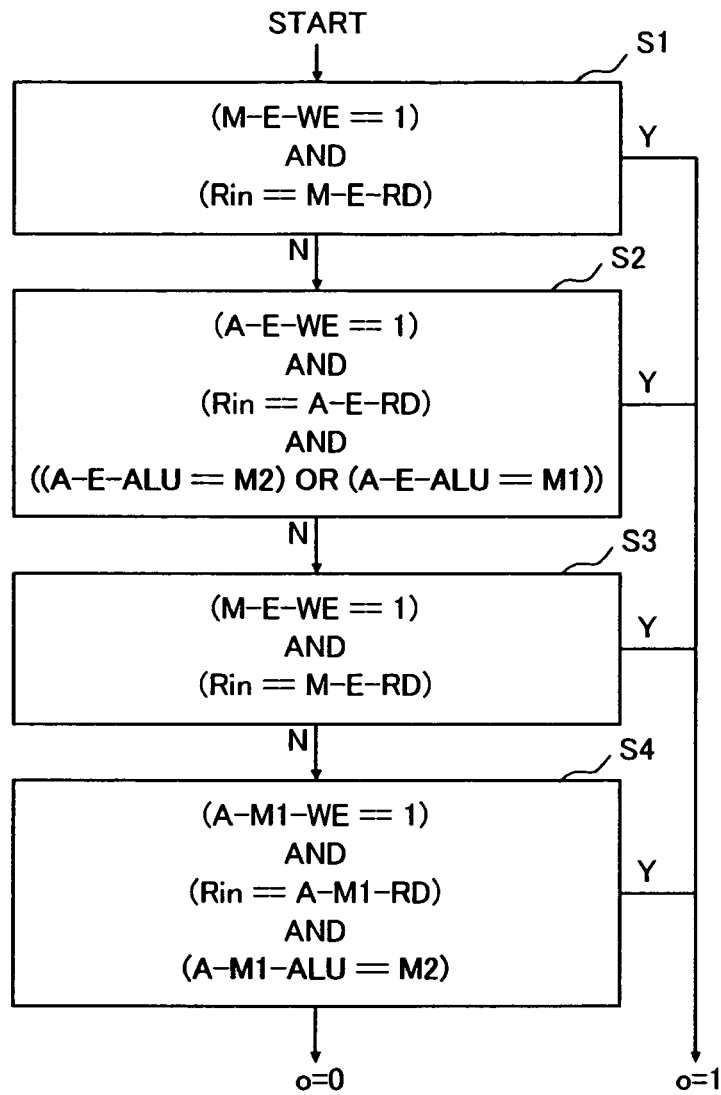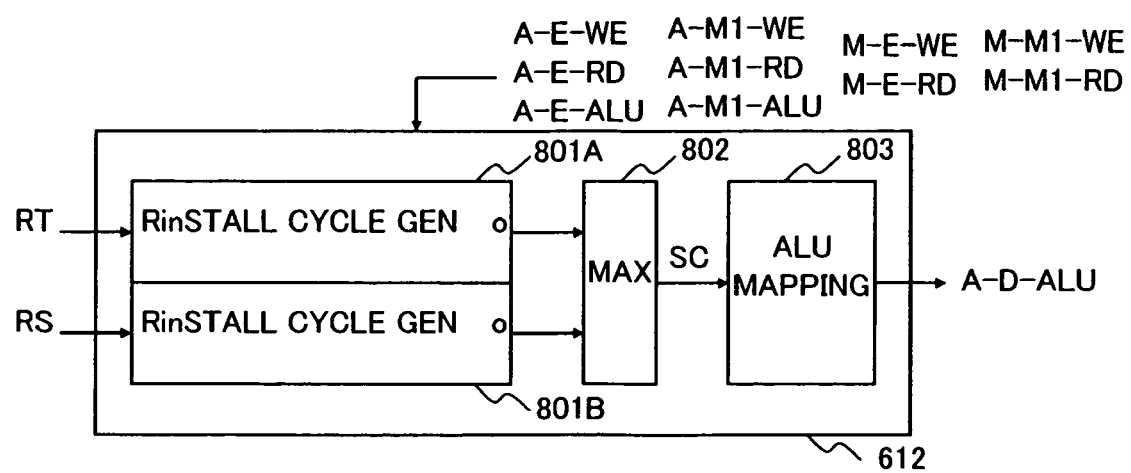

(ALU in use after one cycle)

| (A-E-WE == 1) AND (A-E-ALU == M1) | OR | (A-M1-WE == 1) AND (A-M1-ALU == M2) |

(ALU in use after two cycles)

| (A-E-WE == 1) AND (A-E-ALU == M2) |

| SEQUENCE NUMBER | INSTRUCTION | TYPE OF INSTRUCTION | READ REGISTER | | WRITE REGISTER |
|---|---|---|---|---|---|
| | | | RT | RS | RD |
| 1 | R0+R1→R0 | EXECUTION | R0 | R1 | R0 |
| 2 | [R0+R2]→R3 | ROAD | R0 | R2 | R3 |
| 3 | R3+R0→R0 | EXECUTION | R3 | R0 | R0 |
| 4 | R1+R1→R1 | EXECUTION | R1 | R1 | R1 |
| 5 | R3+R2→R2 | EXECUTION | R0 | R2 | R2 |

DATA PROCESSOR

CLAIM OF PRIORITY

The present application claims priority from Japanese application JP 2005-227695 filed on Aug. 5, 2005 the content of which is hereby incorporated by reference into this application.

FIELD OF THE INVENTION

The present invention relates to a data processor that adopts a pipeline system. More particularly, it relates to a technique useful in application to e.g. a microprocessor.

BACKGROUND OF THE INVENTION

The operating frequency of a microprocessor, which is an example of a data processor, depends on cache access delay in general. Since many of the cache access delays are wiring delays, they are not decreased so much even by scaling down of a semiconductor manufacturing process. For increase in the operating frequency of a microprocessor, it is effective to pipeline the cache access (see e.g. JP-A-05-313893 and particularly FIGS. 10 and 11 thereof).

However, pipelining cache access increases the number of cycles until the time when the result of access is obtained and delays fixing of the result of load. In a typical program, the result of a load instruction for cache access is often used as the input of an execution instruction. Hence, when pipelining cache access delays fixing of the result of load, the number of wait cycles until a data input necessary for the execution of an execution instruction is fixed is increased, and thus the number of cycles required to run a program is also increased.

As described above, pipelining cache access for increase in the operating frequency of a microprocessor increases the number of cycles necessary for the execution of an execution instruction, and therefore the performance which reflects the increase in the frequency can not be attained. To achieve such performance, a measure which can avoid increase in the number of run cycles of an execution instruction even when fixing of the result of load is delayed by pipelining cache access is needed.

Techniques widely used as such measures include an out-of-order system (see e.g. JP-A-2001-236222, and particularly the second to eighth paragraphs thereof). According to the out-of-order system, a string of instructions to be run later are acquired precedently, and an instruction, which does not use the result of the running load instruction, is found out from the string of instructions and run. Basically, when instruction or operand dependence arises, the execution of an instruction is suspended until the dependency is resolved, and an instruction having no dependence is precedently executed jumping the code description turn.

However, with the out-of-order system, a mechanism of ensuring a memory access order, etc. is required because an instruction may be executed precedently with the code description turn left out. Therefore, many additional mechanisms of e.g. precedently acquiring a string of instructions, ferreting out an instruction to be executed, and ensuring a memory access order are needed. For this reason, application of the out-of-order system to low-cost microprocessors is regarded as being difficult in consideration of the manufacturing cost.

As a substitute for the out-of-order system, there has been known a delayed ALU system (see e.g. M. Ozawa, et. al., "Pipeline Structure of SH-X Core for Achieving High Performance and Low Power," In Proc. of COOL Chips VII, pp. 239-254, April 2004). This system is a technique such that the start of execution of an execution instruction is set to the time after one cycle from the start of execution of a load instruction. According to the delayed ALU system, the operation by ALU (Arithmetic and Logic Unit) for performing an arithmetic and logic operation is arranged in a start stage of a cache access, by which the input readout of ALU can be delayed by one cycle. Thus, the number of wait cycles when the result of cache access is used for input of an execution instruction can be reduced by one cycle.

SUMMARY OF THE INVENTION

As described above, with the delayed ALU system, the operation by ALU is arranged in a start stage of cache access and as such, it becomes possible to delay the input readout of ALU by one cycle. Therefore, the number of wait cycles when the result of cache access is used for input of an execution instruction is reduced by one cycle.

However, from a study on the delayed ALU system, the inventor found out that when the result of the execution is used as an address, actually using the delayed ALU system leads to degradation in performance when the result of the execution instruction is used as an address to access a cache. This is because the delayed ALU system causes one-cycle delay of the operation of ALU. Hence, in order to avoid the degradation in performance incident to pipelining of cache access, a technique to suppress the degradation in performance caused by the delayed ALU system is required.

Therefore, it is an object of the invention is to avoid the degradation in performance incident to pipelining of cache access.

The above and other objects of the invention and novel features thereof will be clear from the description hereof and the accompanying drawings.

Of the subject matters herein disclosed, general descriptions of representative examples are presented below briefly.

[1] A data processor having: an instruction fetch unit for acquiring an instruction; and an instruction execution unit for executing, by pipeline processing, the instruction acquired by the instruction fetch unit. In the data processor, the instruction execution unit includes: an execution unit for realizing an execution function of an execution instruction, an execution pipeline pipelined into two or more stages for execution of the execution instruction, and an execution pipeline control unit capable of changing a pipeline stage to arrange an operation by the execution unit in according to a number of wait cycles until data required for execution of the execution instruction is fixed.

According to the above-described means, the execution pipeline control unit can reduce the number of input-fixing wait cycles, which has been increased by pipelining cache access, by changing the pipeline stage where an operation by the execution unit is arranged, depending on the number of wait cycles until the data required for execution of the execution instruction is fixed. This enables the avoidance of degradation in performance involved in pipelining cache access.

[2] A data processor having: an instruction fetch unit for acquiring an instruction; and an instruction execution unit for execution, by pipeline processing, the instruction acquired by the instruction fetch unit. In the data processor, the instruction includes a load instruction for directing load of data. In addition, the instruction execution unit includes: an execution unit for realizing an execution function of an execution instruction; an execution pipeline pipelined into two or more stages for execution of the execution instruction; and an execution pipeline control unit capable of changing a point where data loaded by execution of the load instruction is used in an operation by the execution unit according to a number of wait cycles until the data is fixed in the execution pipeline.

According to the above-described means, the execution pipeline control unit can change the point where data loaded by execution of the load instruction is used in an operation by the execution unit according to the number of wait cycles until the data is fixed, whereby the number of input-fixing wait cycles, which has been increased by pipelining cache access, can be reduced. This enables the avoidance of degradation in performance involved in pipelining cache access.

[3] In the case of [1] or [2], the execution pipeline control unit is arranged so as to accept a result of access to a data cache as data required for execution of the execution instruction in the execution pipeline.

[4] In the case of [3], the execution pipeline control unit arranges an operation by the execution unit in a stage such that the number of wait cycles until the data is fixed is minimum.

[5] In the case of [3], when an attempt to arrange an operation by the execution unit in a stage used in execution of another execution instruction is made, the execution pipeline control unit arranges the operation by the execution unit in a stage further behind the stage in use, whereby the confliction between stages where operations are arranged can be avoided.

[6] In the case of [3], the number of cycles required for execution of the execution instruction using the result of access to a data cache can be varied depending on an instruction executed prior to the execution instruction.

[7] In the case of [3], the execution pipeline may include two or more inter-stage registers, each capable of holding the result of an execution in the execution unit, and a selector capable of making a selection from among outputs of the two or more inter-stage registers. The selection from among the outputs of the inter-stage registers by the selector enables change of a stage where an operation by the execution unit is arranged. [8] In the case of [3], the execution pipeline control unit may be arranged so as to include: a first pipeline capable of holding a signal showing validity of register writing and information on a stage where an operation by the execution unit is arranged; a second pipeline capable of holding a register number of a register written into the register according to the instruction; a third pipeline capable of holding a register number of a register read out from the register according to the instruction; and a read register number generation circuit for selectively supplying an output of the third pipeline to the execution pipeline based on an putout of the first pipeline.

BRIEF DESCRIPTION OF THE DRAWINGS

FIG. 1 is a block diagram showing an example of the configuration of a microprocessor, which is an example of a data processor in association with the invention;

FIG. 2 is a block diagram showing an example of the configuration of an instruction execution unit included in the microprocessor;

FIG. 3 is a block diagram showing an example of the configuration of a memory pipeline included in the microprocessor;

FIG. 8 is a circuit diagram showing an example of the configuration of a stall check circuit included in the memory pipeline control unit;

FIG. 9 is an illustration of assistance in explaining an action by a principal part in the stall check circuit;

FIG. 11 is a circuit diagram showing an example of the configuration a read register number generation circuit included in the execution pipeline control unit;

FIG. 12 is a block diagram showing an example of the configuration of an ALU-positioned stage-judging circuit included in the execution pipeline control unit;

DETAILED DESCRIPTION OF THE PREFERRED EMBODIMENTS

Figure 4:
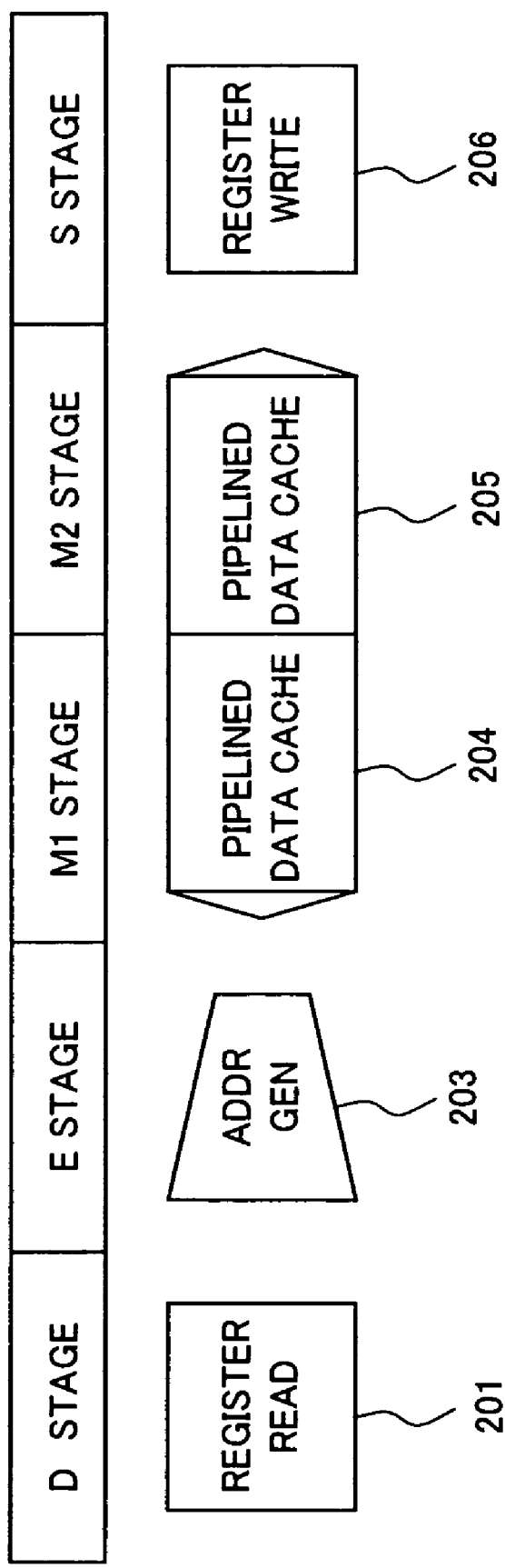
FIG. 4 is an illustration of assistance in explaining an action when the memory pipeline a load instruction.

Referring to FIG. 1, there is shown a microprocessor as an example of a data processor in association with the invention.

The microprocessor 10 shown in FIG. 1 is not particularly limited, but it runs a load instruction and an execution instruction by pipeline. The microprocessor 10 is formed on a semiconductor substrate, such as a monocrystalline silicon substrate, using a well-known semiconductor integrated circuit manufacturing technique.

The microprocessor 10 shown in FIG. 1 is not particularly limited, but it is applied to a computer system including a main memory (not shown), in which a memory controller 20, an instruction fetch unit 40 and an instruction execution unit 50 are connected through a system bus 30 so that they can exchange a signal with one another. In the microprocessor, the memory controller 20 controls data transfer between the microprocessor and the main memory. The instruction fetch unit 40 is for acquiring an instruction to be executed. The instruction execution unit 50 executes an operation according to an instruction acquired by the instruction fetch unit 40, through a pipeline constituted by the five stages of D, E, M1, M2 and S. Further, the instruction fetch unit 40 and the instruction execution unit 50 exchange an instruction, instruction VALID signal and a STALL signal therebetween.

Referring to FIG. 2, there is shown an example of the configuration of the instruction execution unit 50.

The instruction execution unit 50 is not particularly limited, but it includes: a memory pipeline 101 for executing a load instruction; a memory pipeline control unit 102 for controlling the memory pipeline; an execution pipeline 103 for an execution instruction; and an execution pipeline control unit 104 for controlling the execution pipeline. An instruction to be executed is supplied from the instruction fetch unit 40 to the memory pipeline control unit 102 and the execution pipeline control unit 103 depending on the kind thereof. For example, a load instruction is supplied to the load pipeline control unit 102, and an execution instruction is supplied to the execution pipeline control unit 103. To an instruction, an instruction VALID signal, which becomes the logical value "1" when the instruction is valid, is added. In contrast, a STALL signal, which becomes the logical value "1" when it is intended to put off the execution of an instruction, is output from the memory pipeline control unit 102 and the execution pipeline control unit 103. The instruction fetch unit 40 shown in FIG. 1 continues outputting the same instruction while the STALL signal stays at the logical value "1." An example of the case where the memory pipeline control unit 102 and the execution pipeline control unit 103 make the STALL signal the logical value "1" is the case of waiting for the time when a register value to be read out according to an instruction is made available. The memory pipeline 101 and the execution pipeline 104 are arranged so as to accept control signals output from the memory pipeline control unit 102 and the execution pipeline control unit 103 respectively. The memory pipeline control unit 102 and the execution pipeline control unit 103 can exchange various kinds of signals (A-E-WE, A-E-RD, A-E-ALU, A-M1-WE, A-M1-RD, A-M1-ALU, M-E-WE, M-E-RD, M-M1-WE, M-M1-RD) showing information about running instructions respectively. When the cache miss arises in the execution of the instruction, the memory pipeline 101 performs necessary data transfer with the system bus 30. Incidentally, in this example, it is not assumed that a load instruction and an execution instruction are input at a time.

Referring to FIG. 3, there is shown an example of the configuration of the memory pipeline 101.

The memory pipeline 101 is not particularly limited, but it includes a register read circuit (REGISTER READ) 201, inter-stage registers 202A, 202B, 202C, 202D, data caches (PIPELINED DATA CACHE) 204, 205, and a register write circuit (REGISTER WRITE) 206, as shown in FIG. 3.

The register read circuit 201 performs reading of a register (not shown). The address generation circuit 203 uses the result of readout from the register to generate an address targeted for load. As described later, the resultant address is offered to the data caches 204, 205, which are pipelined to the two stages M1 and M2 respectively, and the readout is performed. Then, the register write circuit 206 writes the result of the readout into a register. The inter-stage register 202A is interposed between the register read circuit 201 and the address generation circuit 203, the inter-stage register 202B between the address generation circuit 203 and the data cache 204, the inter-stage register 202C between the data caches 204 and 205, and the inter-stage register 202D between the data cache 205 and the register write circuit 206. Control signals for the memory pipeline 101 include RS and RT signals, both for indicating a read register, an RD signal for indicating a write register, and a WE signal, which becomes the logical value "1" when writing to a register is conducted, and they are supplied from the memory pipeline control unit 102. The register read circuit 201 has a typical register-forwarding function.

Referring to FIG. 4, there is shown an action when the memory pipeline 101 executes a load instruction.

First, in D stage the register read circuit 201 performs readout from a register for address generation, and in E stage the address generation circuit 203 generates an address. After that, in M1 and M2 stages, the data caches are accessed, and in S stage the register write circuit 206 writes the result of load into a register. The value to be written into the register as a result of the load instruction in this way is fixed in M2 stage. Hence, to read out a value from a register into which the result of load has been written, reading of the register may be performed after the M2 stage of a load instruction.

Figure 5:
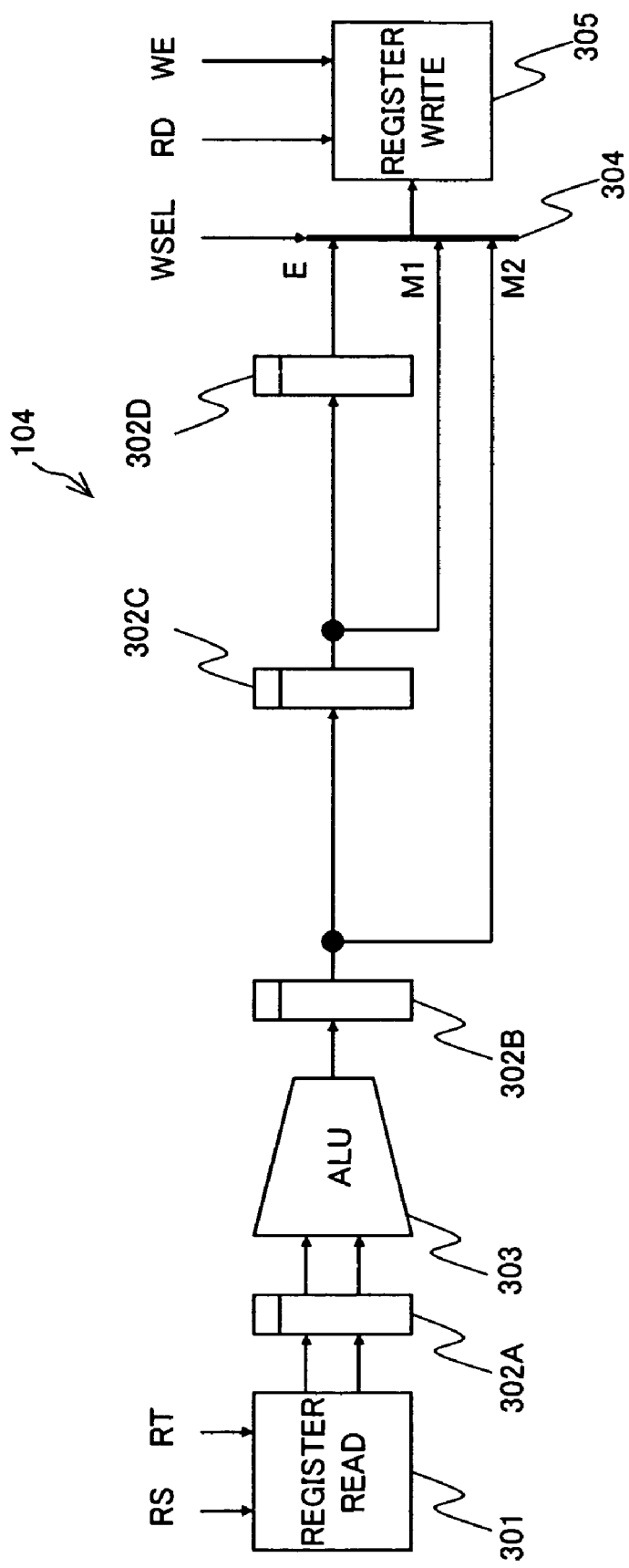
FIG. 5 is a block diagram showing an example of the configuration of an execution pipeline included in the microprocessor.

Referring to FIG. 5, there is shown an example of the configuration of the execution pipeline 104.

The execution pipeline 104 is not particularly limited, but it includes a register read circuit (REGISTER READ) 301, inter-stage registers 302A, 302B, 302C, 302D, an ALU 303, a write selector 304, and a register write circuit (REGISTER WRITE) 305, as shown in FIG. 5. Here, the ALU 303 is an example of an execution unit in association with the invention.

The register read circuit 301 performs reading of a register (not shown). ALU 303 conducts an execution process using the data read out by the register read circuit 301. The result of the execution process by ALU 303 is written into a register (not shown) by the register write circuit 305, in which the value to be written is selected by the write selector 304. The write selector 304 is provided to shift the ALU-positioned stage. The value to be written into the register is selected from among the three outputs of the inter-stage register 302B, the inter-stage register 302C and the inter-stage register 302D. Control signals for the execution pipeline 104 include RS and RT signals, both for indicating a read register, an RD signal for indicating a write register, a WE signal, which becomes the logical value "1" when writing to a register is conducted, and a WSEL signal for controlling the selecting action by the write selector 304, and they are supplied from the execution pipeline control unit 103. The register read circuit 201 has a typical register-forwarding function.

Figure 6:
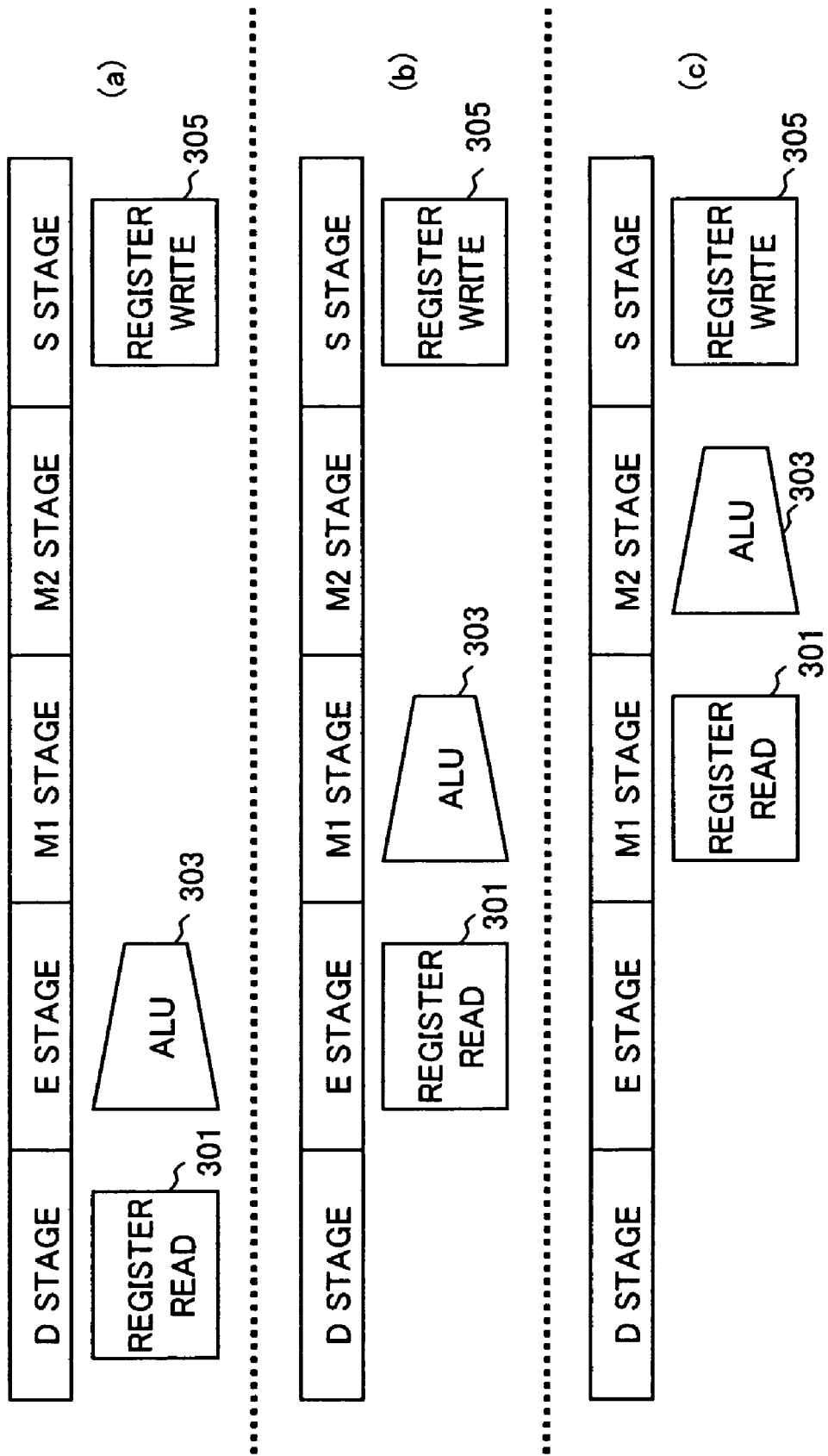
FIGS. 6A, 6B, 6C are a set of illustrations of assistance in explaining an action when the execution pipeline executes an execution instruction.

Referring to FIG. 6, there is shown an example of an action when the execution pipeline 104 executes an execution instruction.

The execution pipeline 104 controls the write selector 304 (see FIG. 5), thereby to change the action thereof in three ways as shown in FIGS. 6A, 6B, 6C.

Of the drawings, FIG. 6A shows an action when the write selector 304 selects the output of the inter-stage register 302D.

In D stage, the register read circuit 301 performs reading of a register (not shown). In E stage, an operation by ALU 303 is performed. In M1 and M2 stages, the result of the operation is transferred as it is. In S stage, the register write circuit 305 writes the result of the operation into a register (not shown).

Referring to FIG. 6B, there is shown an action when the write selector 304 selects the output of the inter-stage register 302C.

In D stage, nothing is done. In E stage, readout from the register is performed. In M1 stage, an operation by ALU 303 is carried out. In M2 stage, the result of the operation is transferred as it is. In S stage, the result of the operation is written into a register.

Referring to FIG. 6C, there is shown an action when the write selector 304 selects the output of the inter-stage register 302B.

Nothing is done in D and E stages. In M1 stage, readout from the register is conducted. In M2 stage, an operation of ALU 303 is performed. In S stage, the register write circuit writes the result of the operation into a register.

Thus, the execution pipeline 104 can select the ALU-positioned stage from among the three stages of E, M1 and M2 under the control of the write selector 304. Hence, the ALU-positioned stage makes a stage in which a vale to be written into a register as the result of an execution instruction is fixed. To correctly read out a register into which the result of the operation has been written, the reading of the register may be performed after the ALU-positioned stage of the execution instruction.

Figure 7:
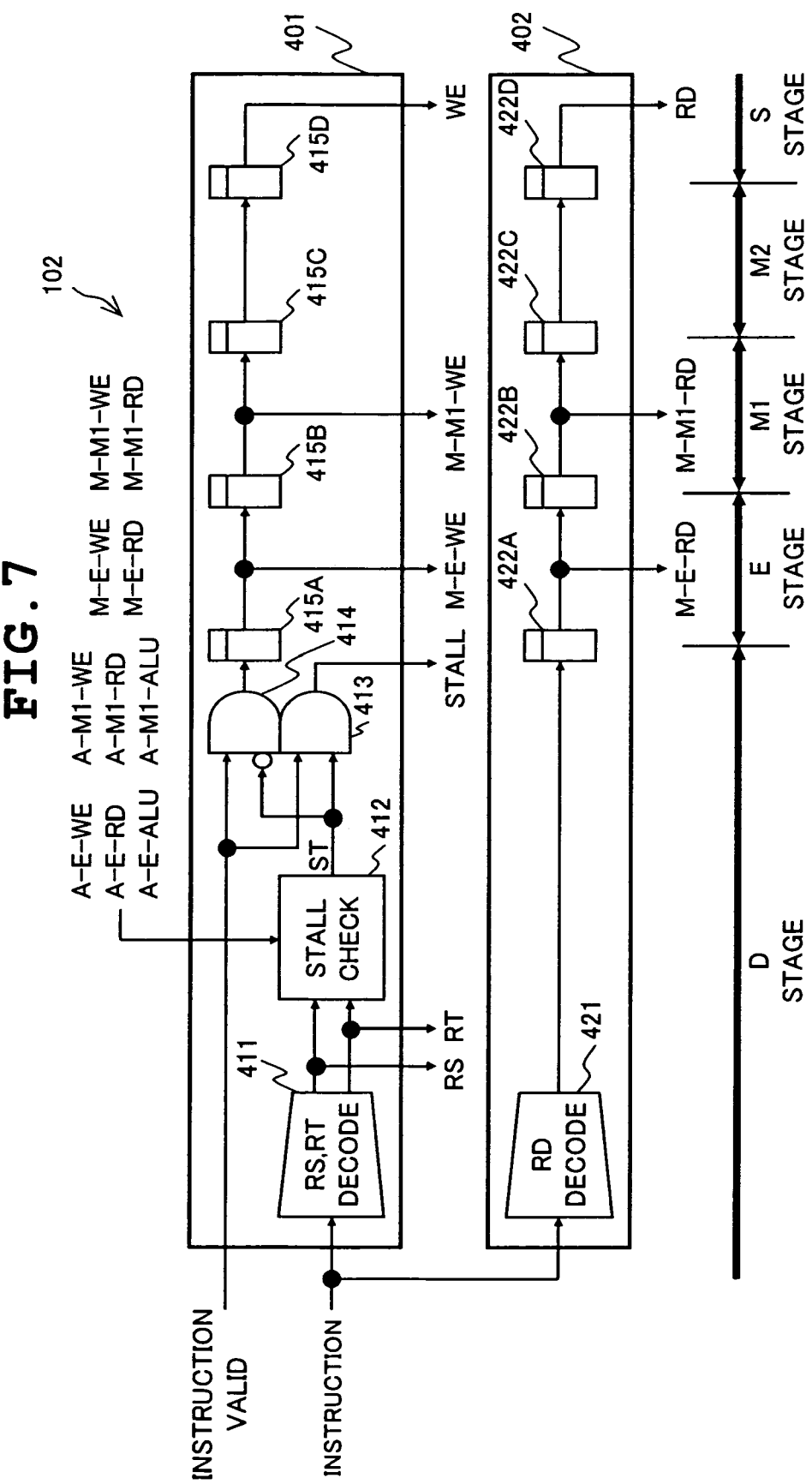
FIG. 7 is a block diagram showing an example of the configuration of a memory pipeline control unit included in the instruction execution unit.

Referring to FIG. 7, there is shown an example of the configuration of the memory pipeline control unit 102.

The memory pipeline control unit 102 is not particularly limited, but it includes, as shown in FIG. 7, a register write valid pipeline 401 for performing control of an instruction execution wait and generation of a WE signal, and a write register number pipeline 402 for holding a register number used for writing the result of load.

The register write valid pipeline 401 includes: an RS, RT decoder (RS, RT DECODE) 411; a stall check unit (STALL CHECK) 412; a stall generation AND gate 413; a register write valid generation AND gate 414; and inter-stage registers 415A, 415B, 415C, 415D. The register write valid pipeline 401 retrieves register numbers RS and RT, which are read out from the instruction by the RS, RT decoder 411 in D stage. The RS and RT are used as an input to the stall check unit 412 for judging the need for register-fixing wait, and an output signal to the memory pipeline 101. The stall check unit 412 checks, in D stage, whether or not values of the register numbers RS and RT are fixed. When the values are not fixed, the ST signal is made the logical value "1." In the case where the ST signal has the logical value "1" with respect to a valid instruction, it is necessary to wait the execution of an instruction and as such, the output from the stall generation AND gate 413 makes a STALL signal. On the other hand, when the ST signal has the logical value "0" with respect to a valid instruction, writing into a register in S stage is needed for the purpose of executing an instruction. Then, the register write valid generation AND gate 414 generates a register write valid signal, which is made the logical value "1" when a register is written. The signal is held by the inter-stage registers 415A-415D until S stage. After that, in S stage the signal is output as a WE signal and used for controlling the writing of the result of load into a register. In the memory pipeline 101, the result of load is not fixed until M2 stage. On this account, to read out a value in the a register, which has written according a certain instruction in E/M1 stage, wait is needed. Hence, for the purpose of creating the wait, a register write valid signal of E/M1 stage is output as an M-E-WE signal/M-M1-WE signal.

The write register number pipeline 402 includes an RD decoder (RD DECODE) 421 and inter-stage registers 422A, 422B, 422C and 422D. The write register number pipeline 402 uses the RD decoder 421 in D stage to retrieve a register number for writing the result of load from the instruction. After that, the retrieved register number is written into the inter-stage registers 422A-422D, and held until S stage. The write register numbers for E, M1 and S stages are identified by M-E-RD, M-M1-RD and RD signals, respectively.

Referring to FIG. 8, there is shown an example of the configuration of the stall check circuit 412.

The stall check circuit 412 is not particularly limited, but it includes, as shown in FIG. 8, stall checkers 501A and 501B and an OR gate 502 disposed in the subsequent stage. The stall checkers 501A and 501B judge the needs for fixing wait of values concerning the registers RS and RT respectively. If it is necessary to wait for the value to be fixed for the resister RS or RT, the execution of the instruction is put off, and therefore the OR logic of outputs (o) of the stall checkers 501A and 501B is needed in the OR gate 502, which makes an ST signal.

Referring to FIG. 9, there is shown an example of an action that the stall checkers 501A and 501B take.

The basic action is as follows. First, comparisons are made between a register Rin to be read out and write registers M-E-RD, M-M1-RD, A-E-RD and A-M1-RD involved in instructions being executed in E and M1 stages of the memory pipeline and execution pipeline. Then, when agreement is found out and the value to be written into the register is unfixed, the output signal o is made "logical value "1," thereby showing the need to wait for readout. Such comparisons are intended to acquire a latest register value. Therefore, the comparisons of S1 and S2 concerning E stage where a later instruction is executed are made in advance of the comparisons of S3 and S4 concerning M1 stage.

In the memory pipeline 101, the result of load, which is a value to be written into a register, is fixed in M2 stage (see FIG. 4). Therefore, when the read register is identical to a write register targeted in E/M1 stage of the memory pipeline 101, the output signal o is made the logical value "1," thereby showing the need to wait.

On the other hand, in the execution pipeline 104, the result of the operation, which is a value to be written into a register, is fixed in any of E, M1 and M2 stages (see FIG. 6). Hence, the need for wait when a register to be read out is identical to a register to be written in E/M1 stage of the execution pipeline 104 depends on the stage in which the operation by ALU 303 is arranged. Therefore, A-E-ALU and A-M1-ALU signals, which indicate the ALU-positioned stages of the instructions in E and M1 stages respectively, are output from the execution pipeline control unit 103, and the output signals are used to judge the need for wait (S2, S4). In other words, in the case where a register to be written in E stage is identical to the read register, the instruction in E stage needs to wait when the operation by ALU 303 is arranged in M1 or M2 stage and as such, a judgment on that is made at Step S2. Also, in the case where a register to be written in M1 stage is identical to the read register, the instruction in M1 stage needs to wait when the operation by ALU 303 is arranged in M2 stage and as such, a judgment on that is made at Step S4.

Figure 10:
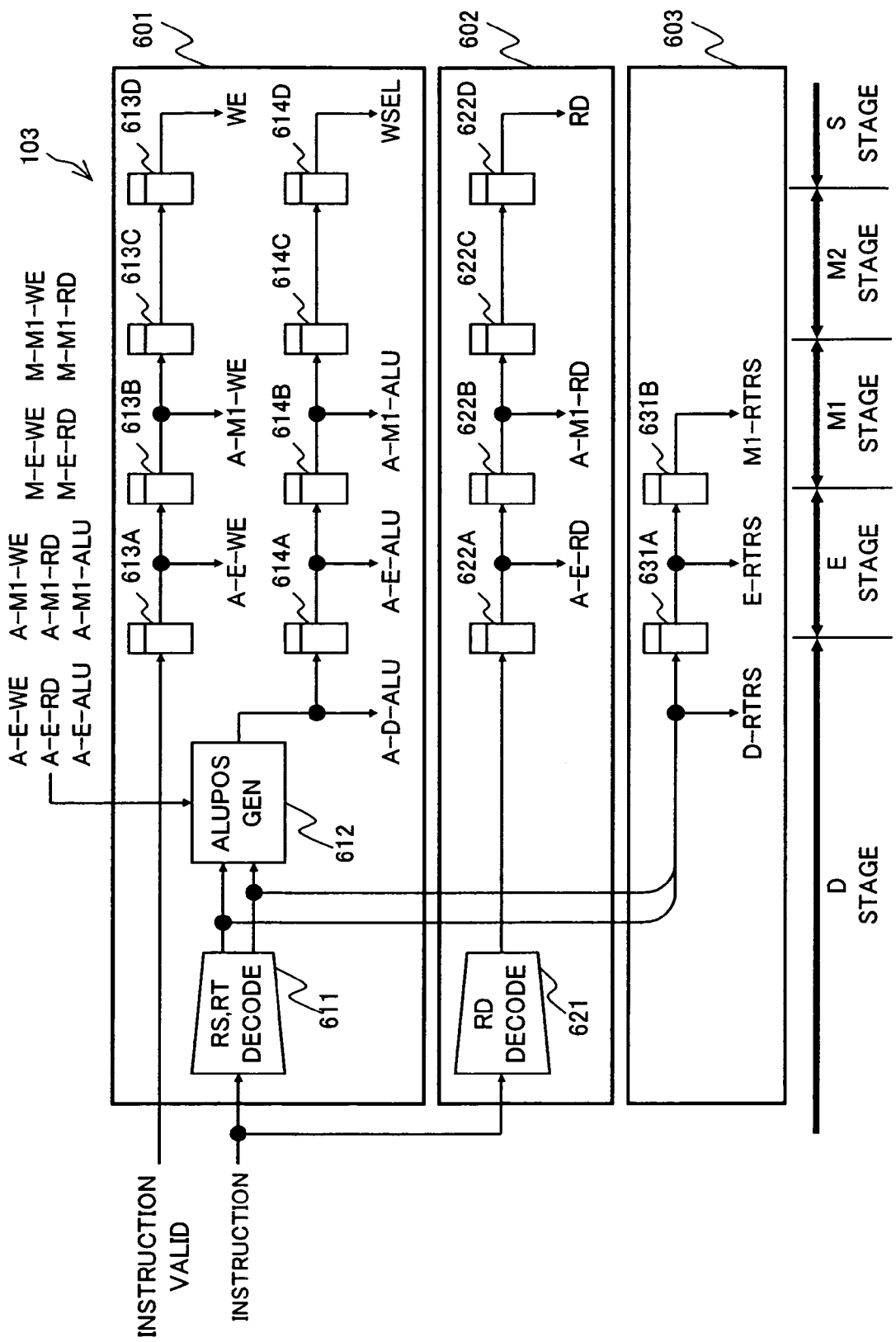
FIG. 10 is a block diagram showing an example of the configuration of an execution pipeline control unit included in the instruction execution unit.

Referring to FIG. 10, there is shown an example of the configuration of the execution pipeline control unit 103.

The execution pipeline control unit 103 is not particularly limited, but it includes, as shown in FIG. 10, an ALU position pipeline 601 capable of holding a valid signal showing the validity of writing into a register and information on the ALU-positioned stage, a write register number pipeline 602 capable of holding the register number of a register to be written according to an instruction, a read register number pipeline 603 capable of holding the register number of a register to be read out according to an instruction, and a read register number generation circuit (not shown, but which is to be elaborated later).

The ALU position pipeline 601 includes: an RS, RT decoder 611; an ALU-positioned stage-judging circuit (ALUPOS GEN) 612; inter-stage registers 613A, 613B, 613C and 613D; and inter-stage registers 614A, 614B, 614C and 614D.

In D stage, the RS, RT decoder 611 retrieves, from an instruction, register numbers RS and RT of registers to be read out. RS and RT are transmitted to the ALU-positioned stage-judging circuit 612. The ALU-positioned stage-judging circuit 612 determines, from the time when values of the registers RS and RT are fixed, the stage in which the operation by ALU 303 is arranged at the time of execution of an execution instruction which is in D stage at present. With the execution pipeline control of the example, the read register-fixing wait can be eliminated by arranging the operation by ALU 303 in the stage where the number of wait cycles until the data required for the execution of an execution instruction is fixed is the smallest, and therefore STALL signal is kept at the logical value "0." Thus, a valid instruction is surely executed, and register writing is performed in S stage. Hence, the instruction VALID signal is used as a register write valid signal directly, and the signal is held by the inter-stage registers 613A-613D until S stage. The register write valid signal of S stage is output as a WE signal and used to control writing of the result of the operation into a register. The register write valid signal for E/M1 stage is output as an A-E-WE/A-M1-WE signal for control of register-fixing wait. In common with the register write valid signal, an ALU position created by the ALU-positioned stage-judging circuit 612 is held by the inter-stage register 614 until S stage. The ALU position in the execution pipeline in this example is changed by controlling the write selector in S stage. On this account, the ALU position held until S stage is output as a write selector control signal WSEL. In common with the register write valid signal, the ALU position for E/M1 stage is output as an A-E-ALU/A-M1-ALU signal for control of register-fixing wait. Further, the ALU position resulting from the judgment in D stage is output as an A-D-ALU signal for register read control.

The write register number pipeline 602 includes an RD decoder (RD DECODE) 621 and inter-stage registers 622A, 622B, 622C and 622D.

RD decoder 621 in D stage retrieves a register number for writing the result of the operation, from an instruction. After that, the retrieved register number is written into the inter-stage registers 622A, 622B, 622C and 622D sequentially, and thus the register number is held until S stage. The write register number for E/M1/S stage is identified by an A-E-RD/A-M1-RD/RD signal.

The read register number pipeline 603 uses the inter-stage registers 631A and 631B to hold the read register numbers RS and RT, which have been retrieved by the RS, RT decoder in D stage until M1 stage. Read register numbers of D, E and M1 stages are output as D-RTRS, E-RTRS and M1-RTRS, respectively.

Referring to FIG. 11, there is shown the read register number generation circuit included in the execution pipeline control unit 103.

The read register number generation circuit is not particularly limited, but it includes, as shown by the reference numeral 604 in FIG. 11, a read register selection control circuit (READ REG SELECT) 701 and a read register number selector 702.

In this example, the operation by ALU 303 is arranged in E, M1 or M2 stage, and the register reading is arranged in D, E or M1 stage accordingly. Therefore, it is required to switch RS and RT, which are the read register numbers to be read out, depending on the ALU position. Hence, the read register selection control circuit 701 creates an action control signal for the read register number selector 702 based on A-D-ALU, A-E-ALU, and A-M1-ALU in the ALU pipeline 601. Based on the action control signal, the read register number selector 702 makes a selection from among D-RTRS, E-RTRS and M1-RTRS in the read register number pipeline 603. Specifically, the selection from among D-RTRS, E-RTRS and M1-RTRS is made as follows.

When A-D-ALU is of Stage E, the terminal X (D-RTRS) of the read register number selector 702 is selected. When A-E-ALU is of Stage M1, the terminal Y (E-RTRS) of the read register number selector 702 is selected. When A-M1-ALU is of Stage M2, the terminal Z (M1-RTRS) of the read register number selector 702 is selected. In other cases, the selection is indefinite. In the execution pipeline control unit 103, the stage to which an execution instruction to perform register reading is currently arranged in this way is determined. Based on the result, the read register number selector 702 selects a read register number. Incidentally, as is not present in this example, when a signal for controlling the operation of ALU, for example, is required, a similar technique can be used to cope with it.

Referring to FIG. 12, there is shown an example of the configuration of the ALU-positioned stage-judging circuit 612.

The ALU-positioned stage-judging circuit 612 is not particularly limited, but it includes, as shown in FIG. 12, stall cycle generation circuits (STALL CYCLE GEN) 801A and 801B, a maximum value select circuit (MAX) 802, and an ALU mapping circuit (ALU MAPPING) 803. In the ALU-positioned stage-judging circuit, the number of wait cycles which is necessary when register reading is performed in D stage is determined, and ALU 303 is arranged in a stage having a stage number equal to or larger than the stage number corresponding to the number of wait cycles. The stall cycle generation circuit 801A and 801B determine numbers of wait cycles when reading is performed in D stage concerning the read registers RS and RT, respectively. The maximum value select circuit 802 selects maximum values of the wait cycle numbers, which are determined for the read registers RS and RT respectively. The ALU mapping circuit 803 determines the ALU-positioned stage (A-D-ALU) based on the created wait cycle numbers.

Figure 13:
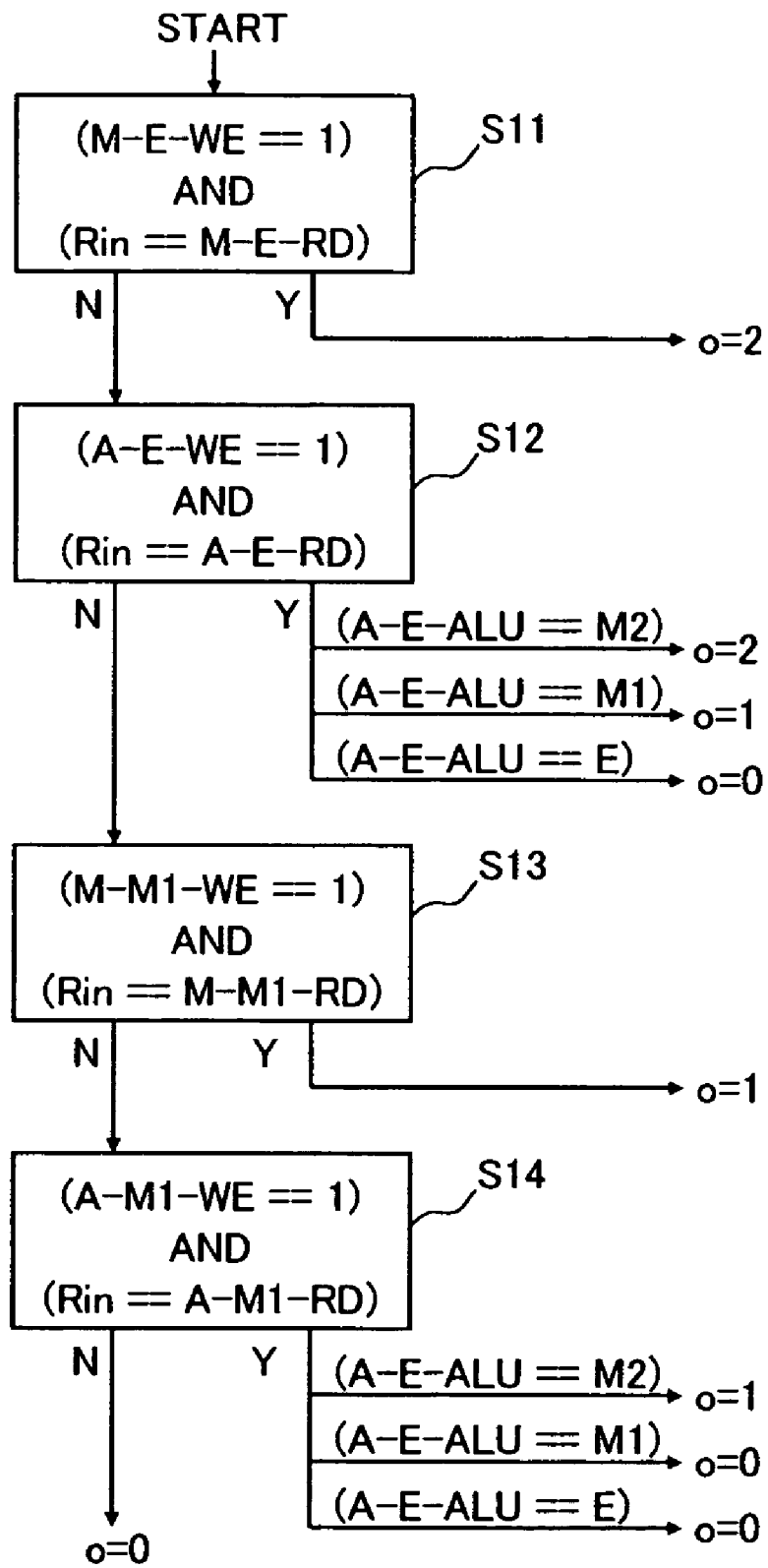
FIG. 13 is an illustration of assistance in explaining an action by a principal part in the ALU-positioned stage-judging circuit.

Referring to FIG. 13, there is shown in examples of actions of the stall cycle generation circuits (STALL CYCLE GEN) 801A and 801B. Their basic actions are the same as those of the stall checkers 501A and 502B shown in FIG. 9 (see FIG. 9). However, they are different in that the number of required wait cycles makes their outputs. As for the number of wait cycles when the register to be written by the memory pipeline 101 is read, it is two cycles when an instruction to perform the writing is in E stage, and one cycle when the instruction is in M1 stage (S1 and S13). However, when the register to be written by the execution pipeline 104 is read, the number of wait cycles varies depending on where an operation by ALU 303 is arranged by an instruction to perform the writing. In the case where the execution instruction to perform the writing is in E stage, the wait cycle number is two when the ALU position is in M2 stage, one when the ALU position is in M1 stage, and zero when the ALU position is in E stage (S12). Likewise, in the case where the execution instruction to perform the writing is in M1 stage, the wait cycle number is one when the ALU position is in M2 stage, and zero when the ALU position in M1 or E stage (S14).

Figures 14, 15:
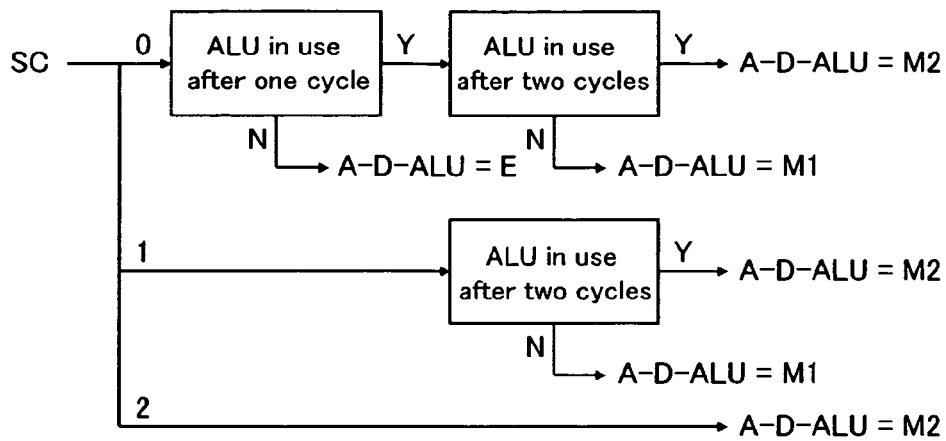
FIG. 14 is an illustration of assistance in explaining an action by a principal part in the ALU-positioned stage-judging circuit.
FIG. 15 is an illustration of assistance in explaining an instruction, which is executed by the instruction execution unit.

Referring to FIG. 14, there is shown an example of an action of the ALU mapping circuit 803.

The action to arrange ALU differs depending on the number of wait cycles until the data necessary for execution of an execution instruction is fixed, i.e. the number of cycles of register read wait for the data required for the execution.

First, in the case where two cycles of register read wait are needed (SC=2), reading the register after M1 stage can eliminate the need for wait and as such, the operation by ALU 303 is arranged in M2 stage (A-D-ALU=M2).

Second, in the case where one cycle of register read wait is needed (SC=1), reading the register after E stage can eliminate the need for wait and as such, the operation by ALU 303 may be arranged in M1 stage (A-D-ALU=E). However, if the ALU-used stage for an execution instruction, which is in E stage at present, is M2 stage, two instructions would use ALU 303 after two cycles. Therefore, when the ALU-used stage for an execution instruction, which is currently in E stage, is M2 stage, the operation by ALU 303 is arranged in M2 stage (A-D-ALU=M2), thereby avoiding the improperness.

Further, in the case where zero cycle of register read wait is needed (SC=0), a value in the register can be read out in D stage and as such, the operation by ALU 303 may be arranged in E stage (A-D-ALU=E). However, as in the case of one cycle of wait, if the ALU position for an execution instruction, which is in E stage at present, is in M1 stage, and if the ALU position for an execution instruction, which is in M1 stage at present, is in M2 stage, more than one instruction would use ALU after one cycle. Hence, the operation by ALU 303 is arranged in M1 stage (A-D-ALU=M1), thereby avoiding the improperness. However, in the case where the ALU position for an execution instruction, which is in E stage at present, is in M2 stage, more than one instruction would use ALU 303 after two cycle even if the operation by ALU 303 is arranged in M1 stage. In this case, the operation by ALU is arranged in M2 stage (A-D-ALU=M2), thereby avoiding the improperness.

Now, principal actions of the instruction execution unit 50 will be described with reference to FIGS. 15 to 17.

Figure 16:
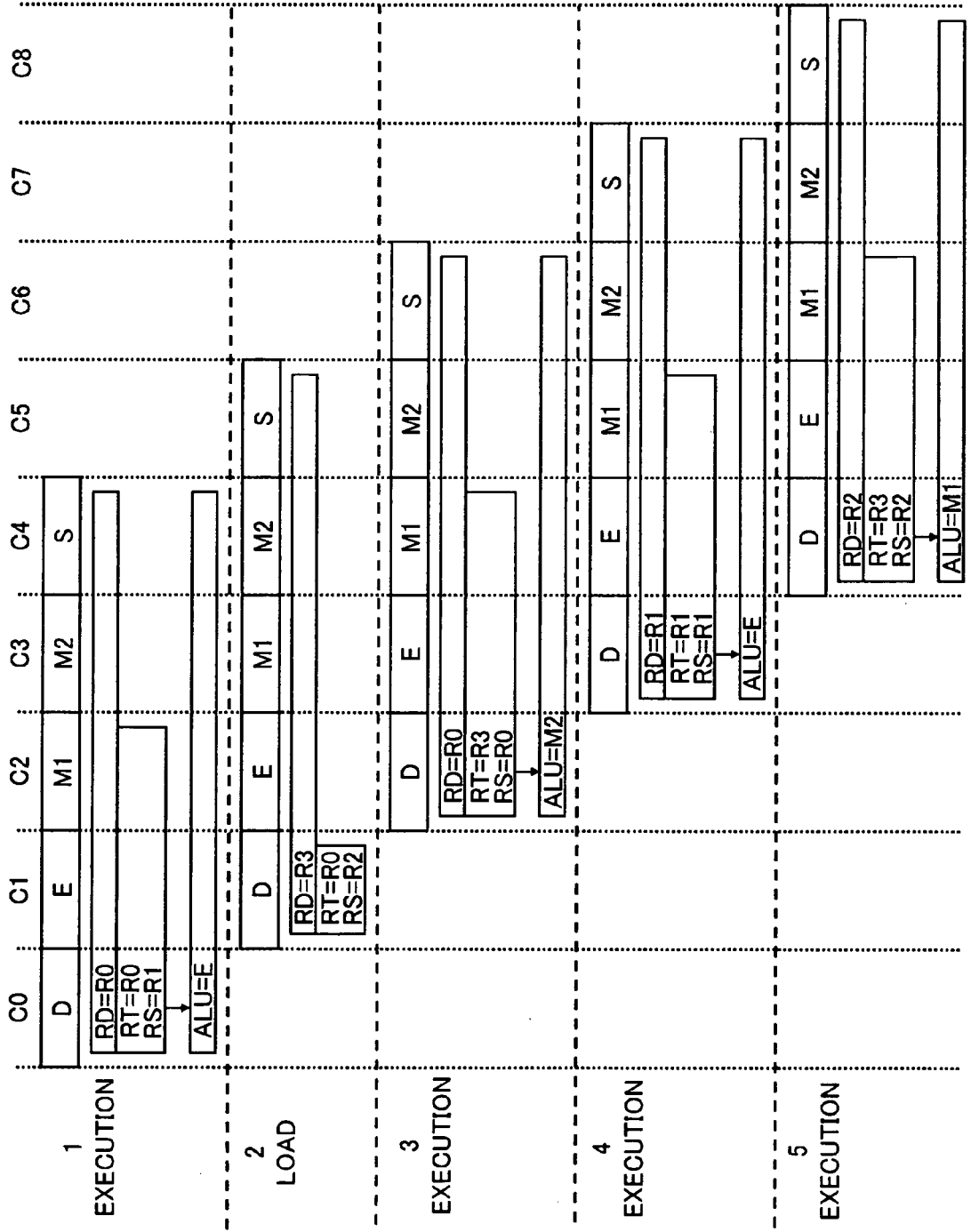
FIG. 16 is an illustration of assistance in explaining how to create control information on an ALU position, etc. when an instruction is executed by instruction execution unit.
Figure 17:
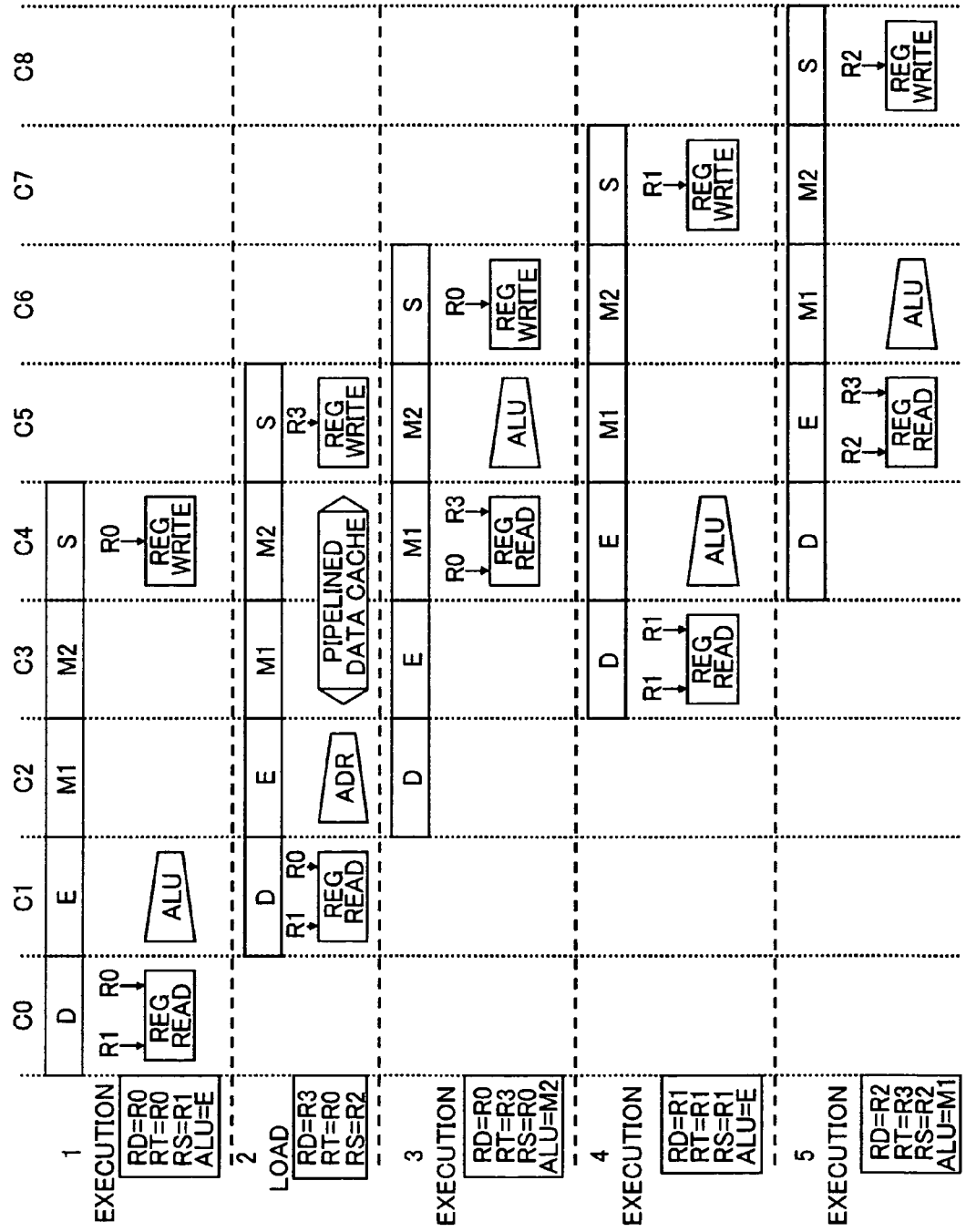
FIG. 17 is an illustration of assistance in explaining how to execute an instruction based on the control information.

Of the drawings, FIG. 15 shows an instruction carried out by the instruction execution unit 50, FIG. 16 shows how to create control information of ALU position, etc. when each instruction is executed, and FIG. 17 shows how to execute the instruction based on the control information shown by FIG. 16. The instructions are executed in the order of 1, 2, 3, 4, and 5 in sequence.

First, an execution instruction 1 is input to D stage in Cycle C0. As an instruction to write registers R0 and R1 to be read by the execution instruction 1 is not in Cycle C0, the number of read wait cycles is zero. Also, no running instruction is in Cycle C0 and as such, the operation by ALU 303 is arranged in E stage.

In Cycle C1, a load instruction 2 is input to D stage. Instructions to write the registers R0 and R2 read out by the load instruction 2 include the execution instruction 1. However, the operation by ALU 303 is arranged in E stage and as such, the result of the operation by ALU 303 can be obtained in Cycle C1. Hence, the wait involved in the load instruction 2 is unnecessary.

In Cycle C2, an execution instruction 3 is input to D stage. As for the registers R0 and R3 read out by the execution instruction 3, the register R0 is targeted for writing by the execution instruction 1 and the register R3 is targeted for writing by the load instruction 2. The read wait of the register R0 is 0 cycle because the operation by ALU 303 has been completed, whereas the read wait of the register R3 is two cycles because the result of load is attained after two cycles. Hence, for the execution instruction 3, the operation by ALU 303 is arranged in M2 stage.

In Cycle C3, an execution instruction 4 is input to D stage. No running instruction to write the register R1 read out by the execution instruction 4 is in Cycle C3 and as such, the number of read wait cycles is zero, and the operation by ALU 303 can be arranged in E stage after one cycle. The time when a running instruction uses ALU 303 is in Cycle C5 of the execution instruction 3 or later, and therefore it is possible to arrange the operation by ALU 303 in Cycle C4 after one cycle. Hence, as for the execution instruction 4, the operation by ALU 303 is arranged in E stage.

In Cycle C4, an execution instruction 5 is input to D stage. The running instruction to write the registers R3 and R2 read by the execution instruction 5 is the load instruction 2. The load instruction 2 reaches M2 stage at that time and as such, the number of wait cycles is zero, and an operation by ALU 303 involved in the execution instruction 5 may be arranged in E stage. However, the execution instruction 3 uses ALU 303 in M2 stage of the load instruction 2 and it is in M1 stage at the time of input of the execution instruction 5. Therefore, collision is caused when the operation by ALU 303 involved in the execution instruction 5 is arranged in E stage. Hence, as for the execution instruction 5, the operation by ALU 303 is arranged in M1 stage, thereby avoiding the collision. As described above, in this example, the register read wait is unnecessary and as such, an instruction can be executed in each cycle and therefore the execution process can be speeded up.

According to the above example, the following effects and advantages can be achieved.

(1) With the out-of-order system, when the instruction dependence or operand dependence arises, the execution of an instruction is suspended until the dependency is resolved, and an instruction having no dependence is precedently executed jumping the code description turn. Thus, the order to execute instructions does not follow the code description turns. In addition, the out-of-order system requires many additional mechanisms including: a mechanism of precedently acquiring a string of instructions; a mechanism of ferreting out an instruction to be executed; and a mechanism of ensuring a memory access order. On this account, application of the out-of-order system to low-cost microprocessors is regarded as being difficult in consideration of the manufacturing cost.

In addition, with the delayed ALU system, when the result of the execution is an address, the delayed ALU causes one-cycle delay of the operation of ALU. This leads to degradation in performance when a cache is accessed using the result of the execution instruction as an address.

In contrast, according to the above-described example, included is the execution pipeline control unit 103 capable of changing the pipeline stage, in which an operation by ALU 303 is arranged, depending on the number of wait cycles until data necessary for execution of the execution instruction is fixed in the case where the result of access to a data cache is used as an input of the execution instruction. Therefore, the number of input-fixing wait cycles, which has been increased by pipelining cache access, can be reduced by arranging the operation by ALU 303 in a stage such that the number of input-fixing wait cycles necessary for execution of the execution instruction is minimum. As a result, the degradation in performance involved in pipelining cache access can be avoided. Further, the above example does not require many additional mechanisms including: a mecha- nism of precedently acquiring a string of instructions; a mechanism of ferreting out an instruction to be executed; and a mechanism of ensuring a memory access order and as such, it can be applied to low-cost microprocessors. In this respect, the above example differs from the out-of-order system, i.e. a system such that when the instruction dependence or operand dependence arises, the execution of an instruction is suspended until the dependency is resolved, and an instruction having no dependence is precedently executed jumping the code description turn.

(2) In the case where the result of access to a data cache is used as an input of an execution instruction, the read register-fixing wait can be eliminated by arranging the operation by ALU 303 in a stage such that the number of wait cycles until data necessary for execution of the execution instruction is fixed is minimum. Specifically, the number of wait cycles until the input is fixed is determined before execution of the execution instruction to arrange the operation by ALU 303 in a stage which is the number of wait cycles behind the input stage of the execution instruction. Thus, the execution process can be performed efficiently. In the case where the number of wait cycles is so large that it is difficult to arrange the operation by ALU 303 in a stage which is the number of wait cycles behind the input stage of the execution instruction, the operation by ALU 303 may be arranged in a stage which is so far from the input stage as possible.

(3) When in the subsequent cycle of an instruction having started running with the operation by ALU 303 arranged in a stage two stages behind its input stage, an instruction with the operation by ALU 303 arranged in a stage right behind its input stage is executed, it is conceivable that two instructions use ALU 303 after one cycle. In the case where there may be a risk of more than one instruction using ALU 303 in the same cycle like this, the time when ALU 303 is to be used is checked to avoid arranging the operation by ALU 303 in that time when the operation by ALU 303 is arranged. Specifically, in the case where an attempt to arrange an operation by ALU 303 in a stage, in which another execution instruction uses an operation by ALU 303, is made, the operation by ALU 303 targeted for the attempt may be arranged in a stage further behind the stage in use. The time when ALU 303 is used can be determined from the information on the stage in which the operation by ALU 303 in association with each running execution instruction is arranged.

(4) The write selector 304 which can select outputs of the inter-stage registers 302B, 302C and 302D is provided, whereby the ALU-positioned stage can be readily selected from among the three kinds based on the outputs of the inter-stage register 302B, inter-stage register 302C and inter-stage register 302D.

While the invention, which was made by the inventor, has been concretely described above, it is not so limited. It is needless to say that various changes and modifications may be made without departing from the subject matter of the invention.

For example, there maybe a case where the number of stages of a cache pipeline is larger. Such case is handled by increasing the positions where the operation by ALU 303 can be arranged, according to the number of stages of the cache pipeline. In addition, there is another embodiment which supports the superscalar, by which two or more instructions can be executed in parallel. In the case of adopting the superscalar, two or more instructions are in the same stage and as such, the register read wait may be put into practice in consideration of the order of the two or more instructions existing in the same stage.

In the above descriptions, the invention, which was made by the inventor, has been explained focusing on the case where it is applied to a microprocessor which is in an applicable field of the invention and is treated principally as the background. However, the invention is not limited to the descriptions and it is widely applicable to various kinds of data processors.

What is claimed is:

1. A data processor comprising:
an instruction fetch unit for acquiring an instruction; and
an instruction execution unit for execution, by pipeline processing, the instruction acquired by the instruction fetch unit,
wherein the instruction execution unit includes
an execution unit for realizing an execution function of an execution instruction,
an execution pipeline pipelined into two or more stages for execution of the execution instruction, and
an execution pipeline control unit capable of changing a stage to arrange an operation by the execution unit according to a number of wait cycles until data required for execution of the execution instruction in the execution pipeline is fixed.

2. A data processor comprising:
an instruction fetch unit for acquiring an instruction; and
an instruction execution unit for execution, by pipeline processing, the instruction acquired by the instruction fetch unit,
wherein the instruction includes a load instruction for directing load of data, and
the instruction execution unit includes
an execution unit for realizing an execution function of an execution instruction,
an execution pipeline pipelined into two or more stages for execution of the execution instruction, and
an execution pipeline control unit capable of changing a point where data loaded by execution of the load instruction is used in an operation by the execution unit according to a number of wait cycles until the data is fixed in the execution pipeline.

3. The data processor of claim 1, wherein the execution pipeline control unit accepts a result of access to a data cache as data required for execution of the execution instruction in the execution pipeline.

4. The data processor of claim 3, wherein the execution pipeline control unit arranges an operation by the execution unit in a stage such that the number of wait cycles until the data is fixed is minimum.

5. The data processor of claim 3, wherein when an attempt to arrange an operation by the execution unit in a stage used in execution of another execution instruction is made, the execution pipeline control unit arranges the operation by the execution unit in a stage further behind the stage in use.

6. The data processor of claim 3, wherein a number of cycles required for execution of the execution instruction using the result of access to a data cache can be varied depending on an instruction executed prior to the execution instruction.

7. The data processor of claim 3, wherein the execution pipeline includes
two or more inter-stage registers, each capable of holding a result of an execution in the execution unit, and
a selector capable of making a selection from among outputs of the two or more inter-stage registers, wherein the selection from among the outputs of the inter-stage registers by the selector enables change of a stage where an operation by the execution unit is arranged.

8. The data processor of claim 3, wherein the execution pipeline control unit includes:

a first pipeline capable of holding a signal showing validity of register writing and information on a stage where an operation by the execution unit is arranged;

a second pipeline capable of holding a register number of a register written into the register according to the instruction;

a third pipeline capable of holding a register number of a register read out from the register according to the instruction; and a read register number generation circuit for selectively supplying an output of the third pipeline to the execution pipeline based on an putout of the first pipeline.

* * * * *